United States Patent
Garcarz et al.

(10) Patent No.: US 11,863,432 B1
(45) Date of Patent: Jan. 2, 2024

(54) OPPORTUNISTIC USER FEEDBACK GATHERING FOR APPLICATION-AWARE ROUTING

(71) Applicant: Cisco Technology, Inc., San Jose, CA (US)

(72) Inventors: Michal Wladyslaw Garcarz, Cracow (PL); Grégory Mermoud, Venthône (CH); Jean-Philippe Vasseur, Saint Martin d'Uriage (FR); Eduard Schornig, Haarlem (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/873,327

(22) Filed: Jul. 26, 2022

(51) Int. Cl.
  *H04L 45/302* (2022.01)
  *H04L 67/10* (2022.01)
  *H04L 43/08* (2022.01)

(52) U.S. Cl.
  CPC ............ *H04L 45/302* (2013.01); *H04L 43/08* (2013.01); *H04L 67/10* (2013.01)

(58) Field of Classification Search
  None
  See application file for complete search history.

(56) References Cited

U.S. PATENT DOCUMENTS

| | | | |
|---|---|---|---|
| 1,088,781 A * | 3/1914 | Kelly | H02K 23/36 310/184 |
| 8,145,073 B2 | 3/2012 | Bouchard et al. | |
| 8,886,552 B2 | 11/2014 | Finkelstein et al. | |
| 11,308,531 B2 | 4/2022 | Lewis et al. | |
| 11,349,731 B2 | 5/2022 | Bonaventura et al. | |
| 11,411,839 B1 * | 8/2022 | Sandhu | H04L 41/5064 |
| 2009/0089294 A1 * | 4/2009 | Davis | H04N 21/475 |
| 2014/0089384 A1 * | 3/2014 | Diaz | H04W 72/51 709/203 |
| 2014/0324749 A1 * | 10/2014 | Peters | G09B 7/04 706/46 |
| 2023/0140115 A1 * | 5/2023 | Vasseur | H04L 45/50 709/238 |

FOREIGN PATENT DOCUMENTS

| | | |
|---|---|---|
| WO | 2019209172 | 10/2019 |
| WO | 2022029465 | 2/2022 |

OTHER PUBLICATIONS

"Cisco AnyConnect Secure Mobility Solution Guide", online: https://www.cisco.com/c/dam/en/us/td/docs/security/wsa/wsa7-0/user_guide/AnyConnect_Secure_Mobility_SolutionGuide.pdf, Feb. 27, 2011, accessed Jul. 14, 2022, 24 pages, Cisco Systems, Inc.

* cited by examiner

*Primary Examiner* — Quang N Nguyen
(74) *Attorney, Agent, or Firm* — BEHMKE INNOVATION GROUP LLC; Kenneth J. Heywood; James J. Wong

(57) ABSTRACT

In one embodiment, a device identifies a potential change in user experience of an online application. The device selects, based on the potential change in user experience, a set of one or more users of the online application. The device obtains, from the set of one or more users of the online application, feedback regarding their experience with the online application. The device uses the feedback obtained from the set of one or more users of the online application to make a routing decision in a network regarding traffic of the online application.

18 Claims, 10 Drawing Sheets

OPPORTUNISTIC USER FEEDBACK GATHERING FOR APPLICATION-AWARE ROUTING

TECHNICAL FIELD

The present disclosure relates generally to computer networks, and, more particularly, to opportunistic user feedback gathering for application-aware routing.

BACKGROUND

In recent years, more and more applications have moved to the cloud, with software-as-a-service (SaaS) becoming a popular delivery model. In contrast to locally-run applications, the user experience of an online application is also a function of the performance of the network providing connectivity to the online application. For instance, network path conditions such as loss, latency, or jitter could greatly impact the experience of a user of the application, such as by causing the application to freeze, errors to appear, etc.

Traditionally, efforts to ensure acceptable user experience in an online application have focused on using network metrics for a proxy of the user experience. More specifically, service level agreements (SLAs) are often set with respect to the network metrics and define the thresholds as to what is considered acceptable and unacceptable. However, setting an appropriate SLA for an application can be quite challenging and not every SLA violation actually affects the user experience. For example, two real-time voice calls may have different loss thresholds based on the audio codec being used a voice application that uses a lossy codec such as Opus may be resistant until a packet loss of up to 30%, where as other audio codecs such as advanced audio coding (AAC) usually is not resilient to such high loss thresholds.

Obtaining actual user feedback regarding their satisfaction with their application experience is typically avoided for various reasons. Indeed, user feedback is subjective and often influenced by the previous experience of the user. Many application vendors also do not want to annoy their users by seeking feedback. Even in cases in which an application does collect some user feedback (e.g., at the end of a video conferencing call), this feedback may be too basic to tie the user experience to the performance of the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
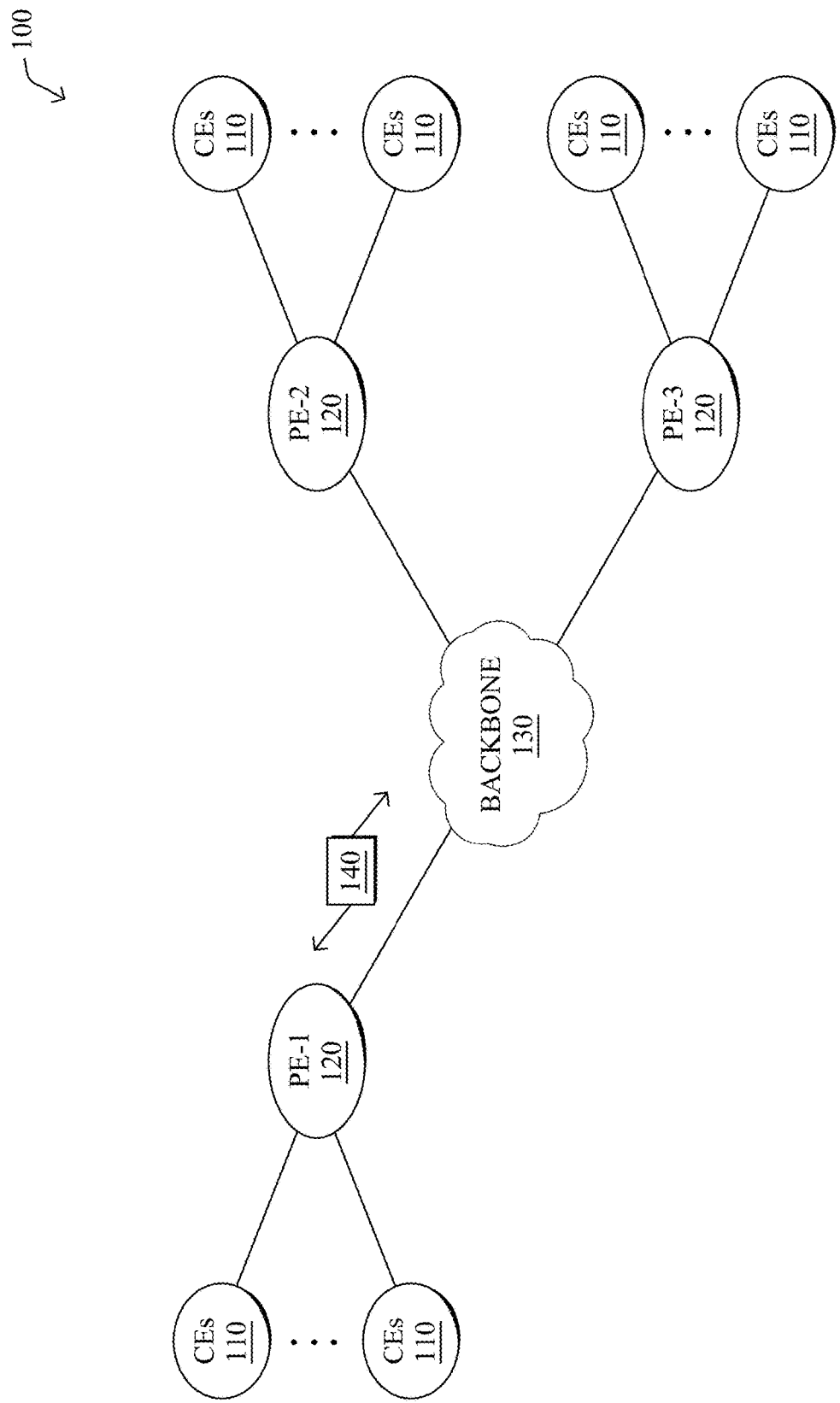
FIGS. 1A-1B illustrate an example communication network.

According to one or more embodiments of the disclosure, a device identifies a potential change in user experience of an online application. The device selects, based on the potential change in user experience, a set of one or more users of the online application. The device obtains, from the set of one or more users of the online application, feedback regarding their experience with the online application. The device uses the feedback obtained from the set of one or more users of the online application to make a routing decision in a network regarding traffic of the online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network by the CE router via two primary links (e.g., from different Service Providers), with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.
2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
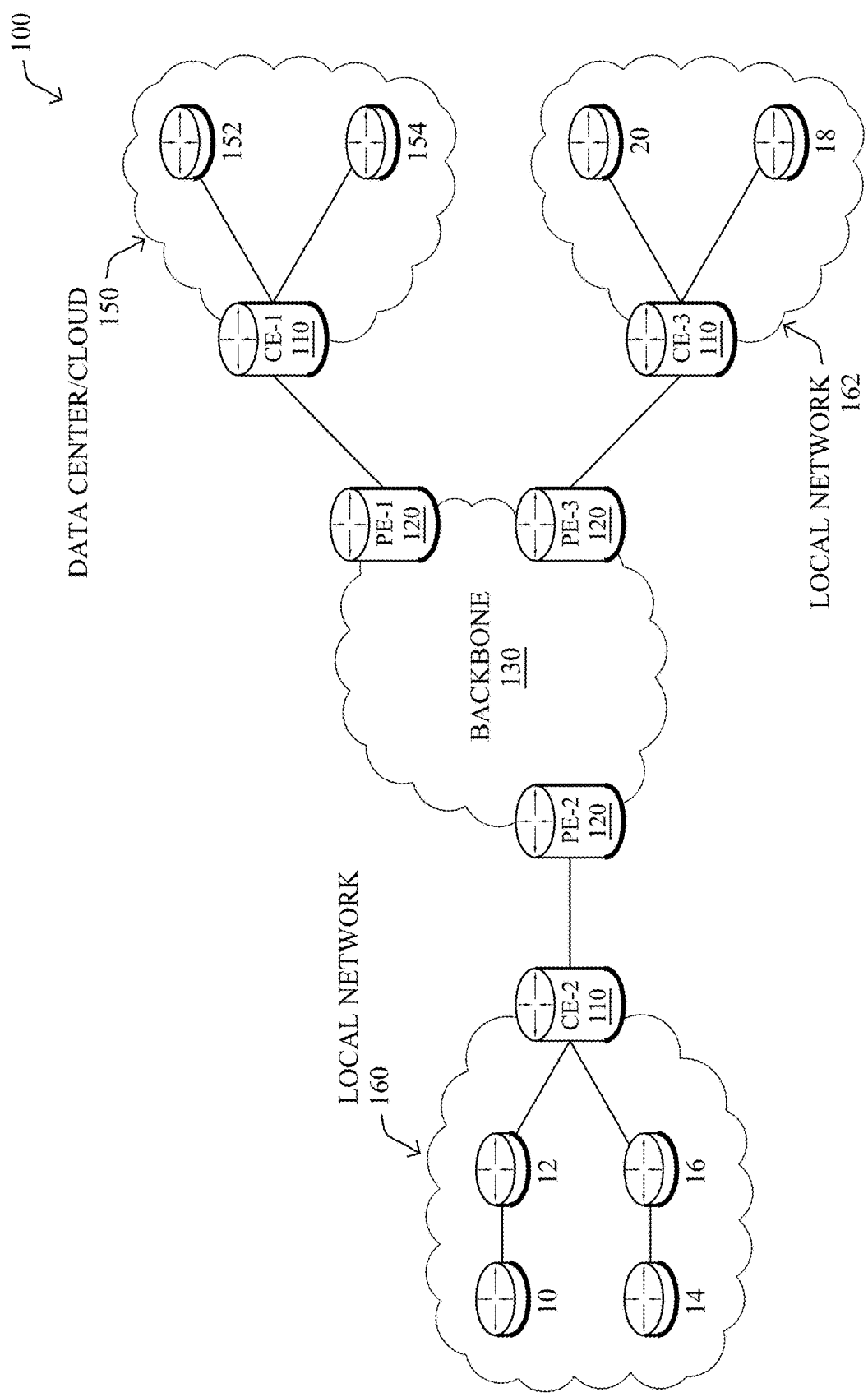

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
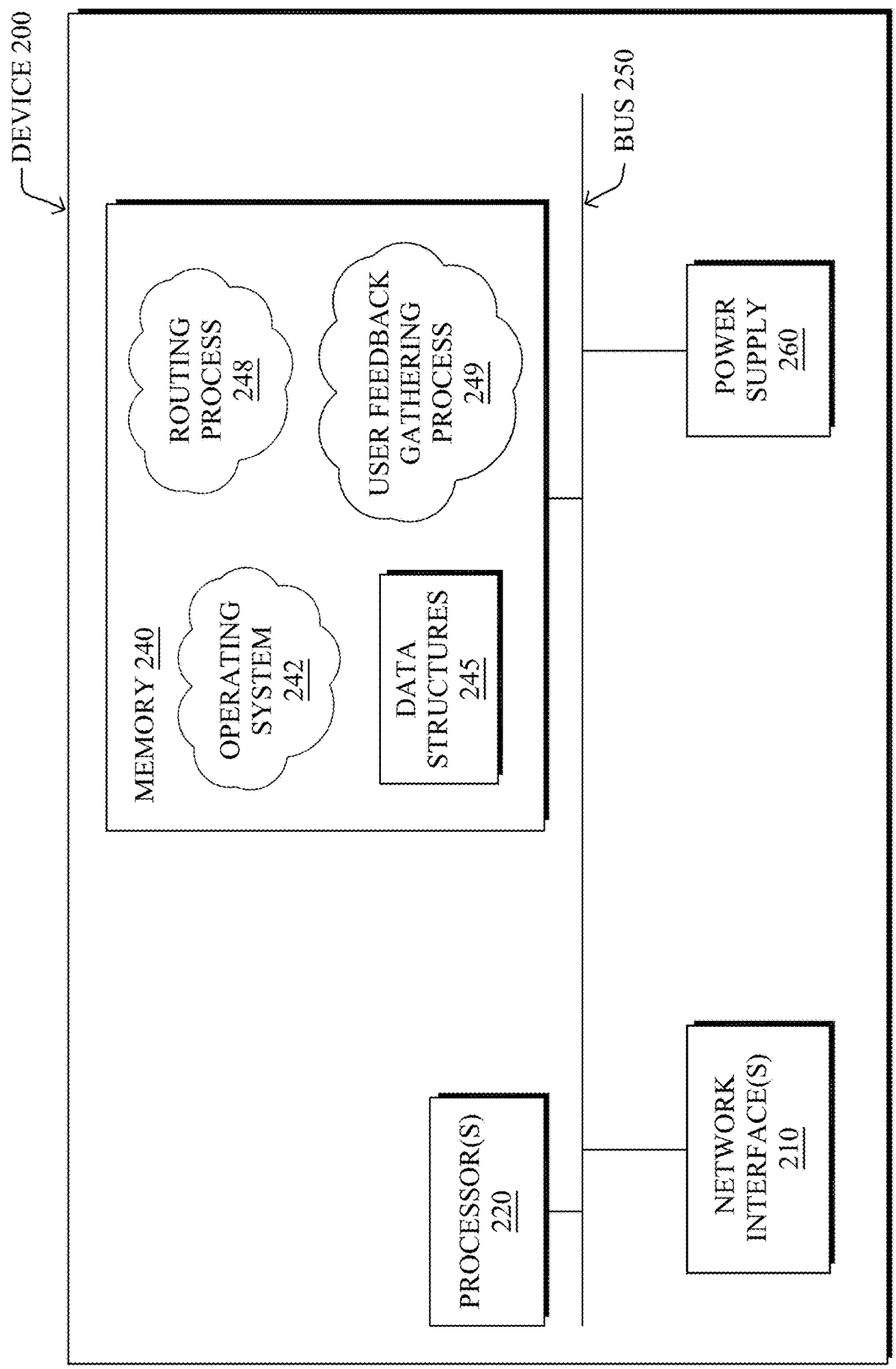
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 248 and/or a user feedback gathering process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 248 and/or user feedback gathering process 249 may include computer executable instructions that, when executed by processor(s) 220, cause device 200 to perform the techniques described herein. To do so, in some embodiments, routing process 248 and/or user feedback gathering process 249 may utilize artificial learning/machine learning.

In general, artificial intelligence/machine learning is concerned with the design and the development of techniques that take as input empirical data (such as network statistics and performance indicators), and recognize complex patterns in these data. One very common pattern among these techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 248 and/or user feedback gathering process 249 may employ one or more supervised, unsupervised, or semi-supervised machine learning models. Generally, supervised learning entails the use of a training set of data, as noted above, that is used to train the model to apply labels to the input data. For example, the training data may include sample data that has been labeled as indicative of acceptable user experience or poor user experience. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 248 and/or user feedback gathering process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
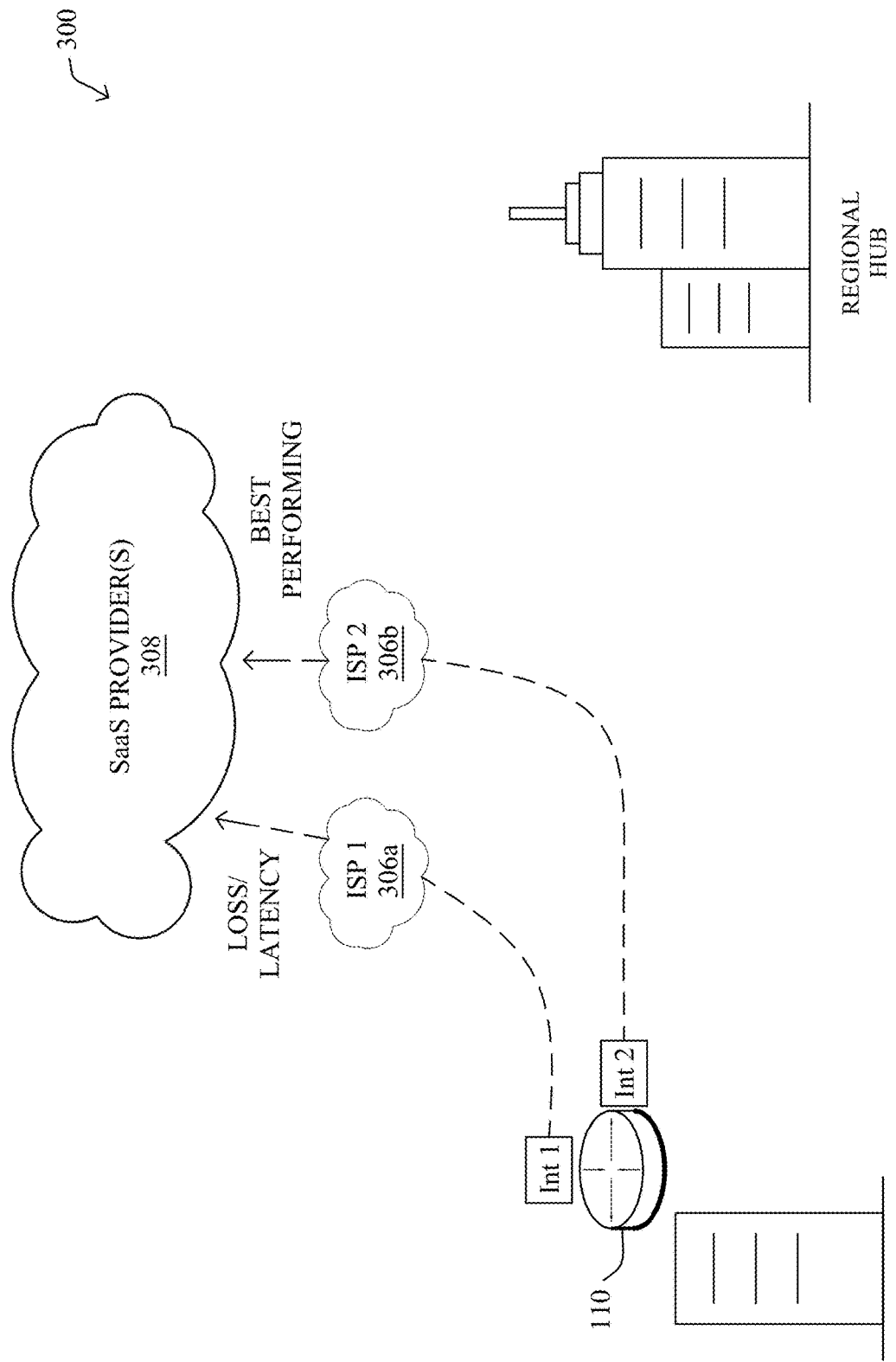
FIGS. 3A-3B illustrate example network deployments.
Figure 3B:
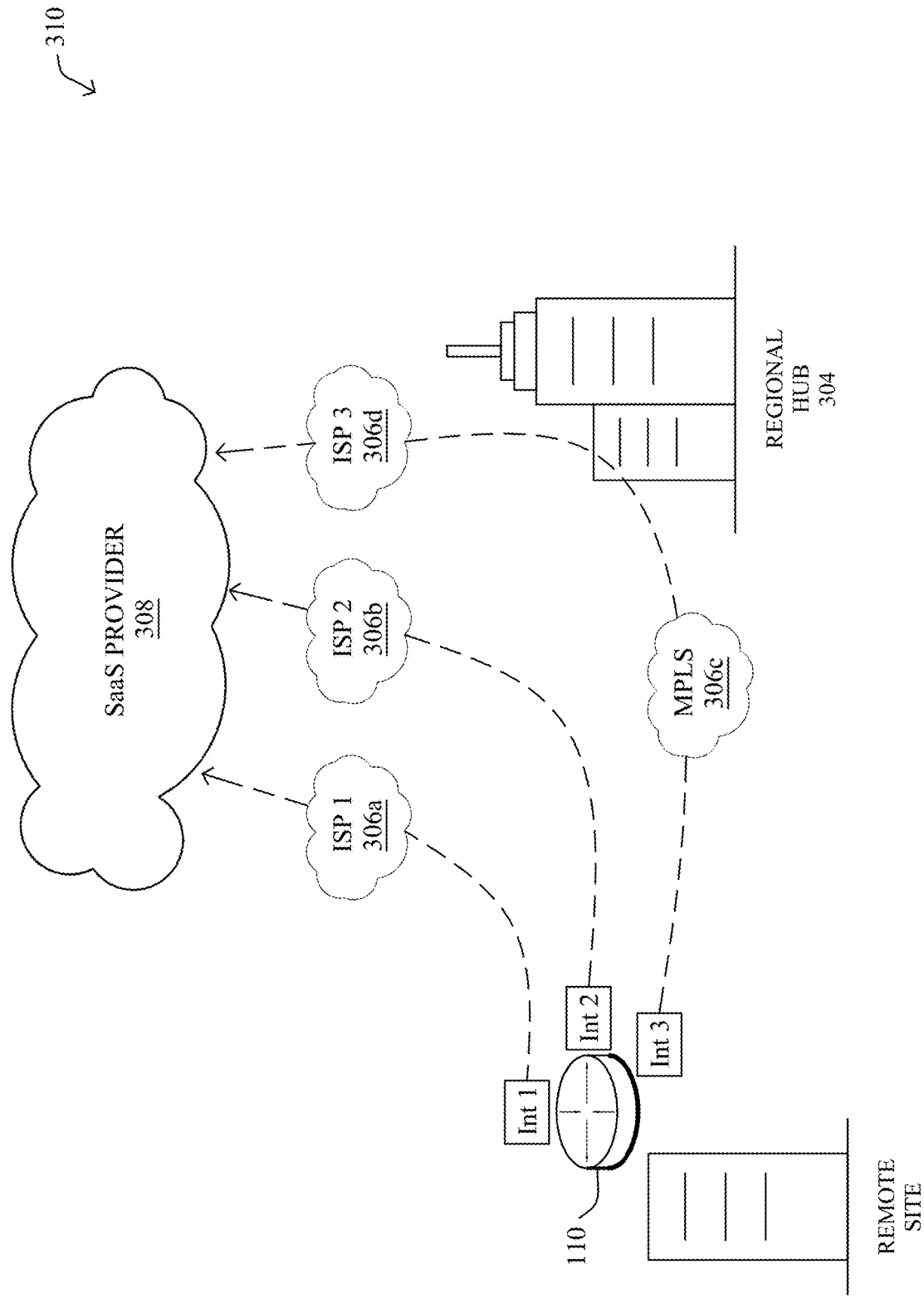

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
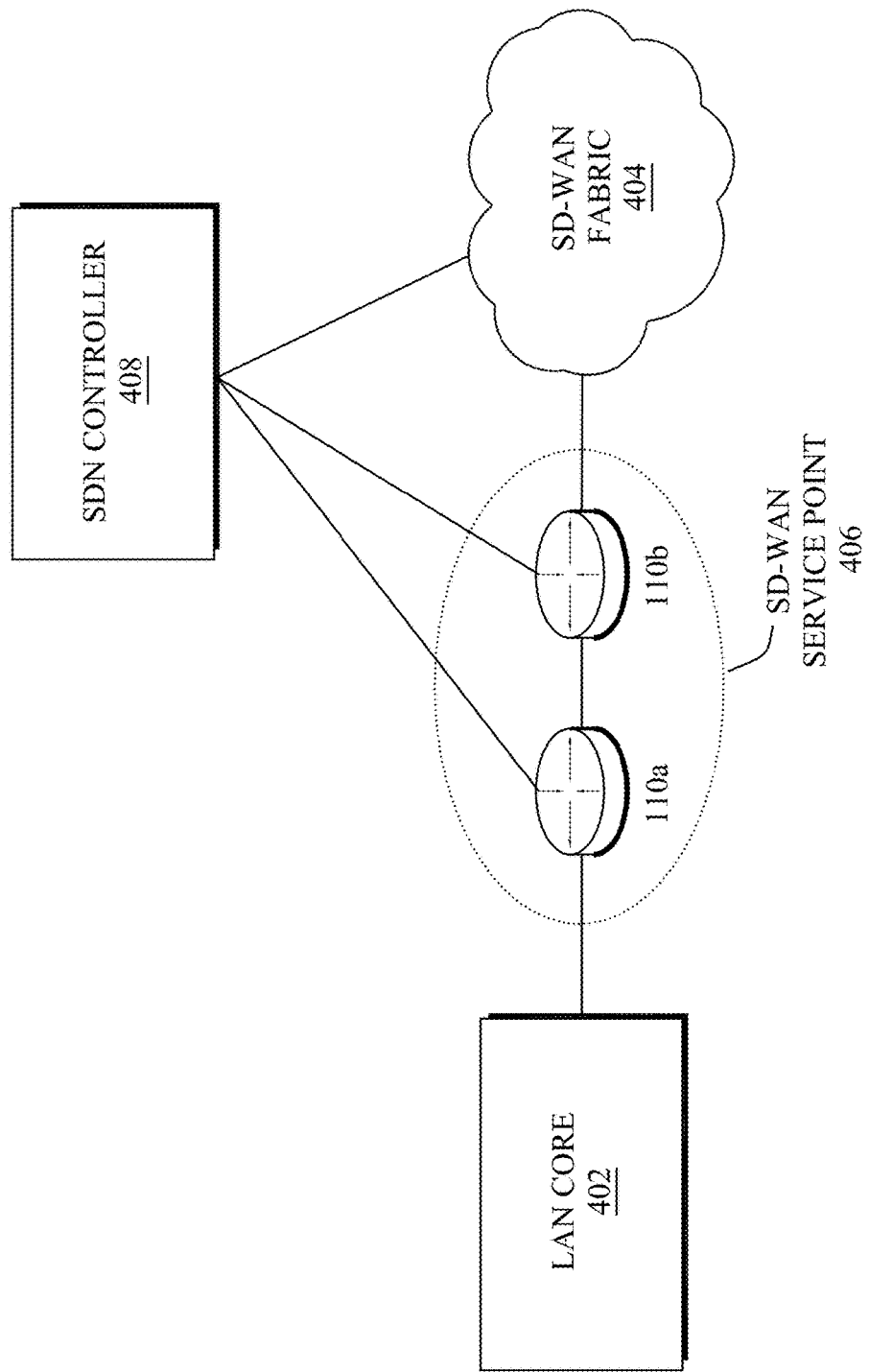
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

A primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application (i.e., the user experience).

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SI)-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SP's) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The tem' 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given dine, in contrast with the notion of an informed decision.

SLA failures are very common in the Internet and a good proportion of them could be avoided (e.g., using an alternate path), if predicted in advance.

Figure 4B:
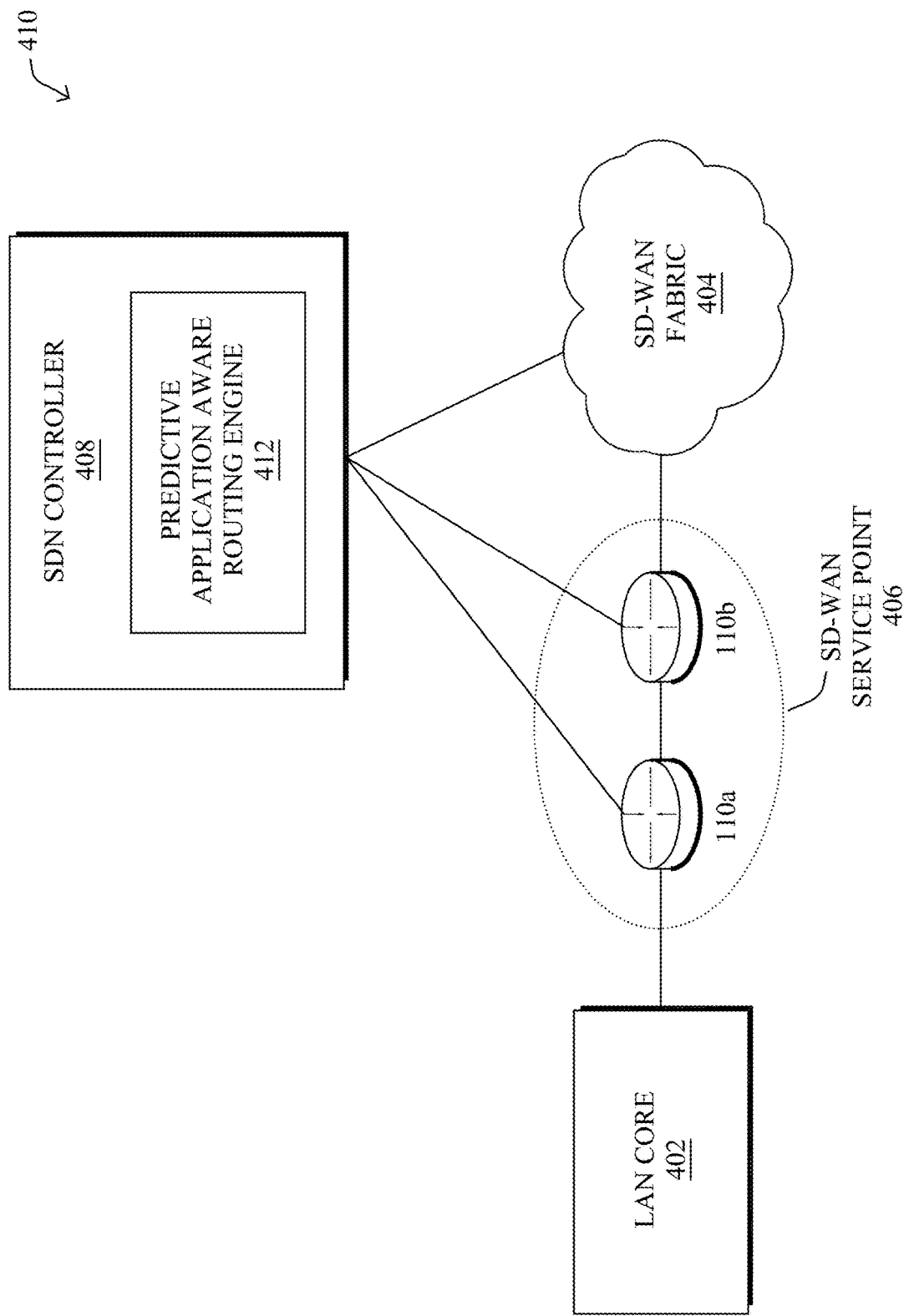

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As would be appreciated, modern SaaS applications are typically delivered globally via public cloud infrastructure: using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront PoPs, etc.), in reality it might run in a single region/location and user experience might vary greatly based on the location.

To determine the QoE for a particular online/SaaS application, various approaches are possible such as:

Obtaining user feedback directly from the application

Applying traffic analytics, such as by analyzing Netflow records that include extra metrics like Application Response Time (ART)

Sending synthetic path probes to measure networking metrics to each SaaS application from each location. These probes are 'synthetic' in that they seek to mimic the actual characteristics of the traffic of the application under scrutiny.

Using hand-crafted heuristics based on domain expertise and other quantities (e.g., the concealment time)

In various embodiments, predictive application aware routing engine 412 may make use of any or all of the above approaches. For instance, predictive application aware routing engine 412 may make use of an application programming interface (API) for a particular online application, allowing it to obtain application experience/QoE metrics directly from the application. Such metrics may be combined with probing results and/or path telemetry. This is in sharp contrast to network-centric approaches that do not necessarily reflect the true user experience.

As would be appreciated, direct user feedback regarding their application experience provides the truest measure of the QoE of the application and the only real form of ground truth. However, there are various reasons that user feedback is typically not collected, such as the following:

User feedback may be biased and influenced by subjective factors such as the expectations of a user based on their previous experience.

Gathering user feedback in a simplistic manner, such as asking users to score their satisfaction with the application on a scale of 1-5, may not be enough to make meaningful inferences about the network. Indeed, multiple questions may need to be asked, or certain context captured, to obtain a complete view of the performance of the network and the application.

Vendors are very afraid of "annoying" users by asking for feedback.

Even in cases in which an application does ask its users for feedback. this is typically done at predefined times, such as at the very end of a videoconferencing call. This time, though, is often inconvenient for users, who might already be rushing to their next meeting or simply needing a break. In addition, doing so completely decouples the feedback from when the disruption(s) actually occurred.

Opportunistic User Feedback Gathering for Application-Aware Routing

The techniques herein introduce mechanisms to request user feedback regarding an online application at the right time, to be able to accurately find the root cause of a potential issue. In some aspects, the techniques herein may also control when, how, and to whom, user feedback request are sent by the system.

Illustratively, the techniques described herein may be performed by hardware, software, and/or firmware, such as in accordance with user feedback gathering process 249, which may include computer executable instructions executed by the processor 220 (or independent processor of interfaces 210) to perform functions relating to the techniques described herein, such as in conjunction with routing process 248.

Specifically, according to various embodiments, a device identifies a potential change in user experience of an online application. The device selects, based on the potential change in user experience, a set of one or more users of the online application. The device obtains, from the set of one or more users of the online application, feedback regarding their experience with the online application. The device uses the feedback obtained from the set of one or more users of the online application to make a routing decision in a network regarding traffic of the online application.

Figure 5:
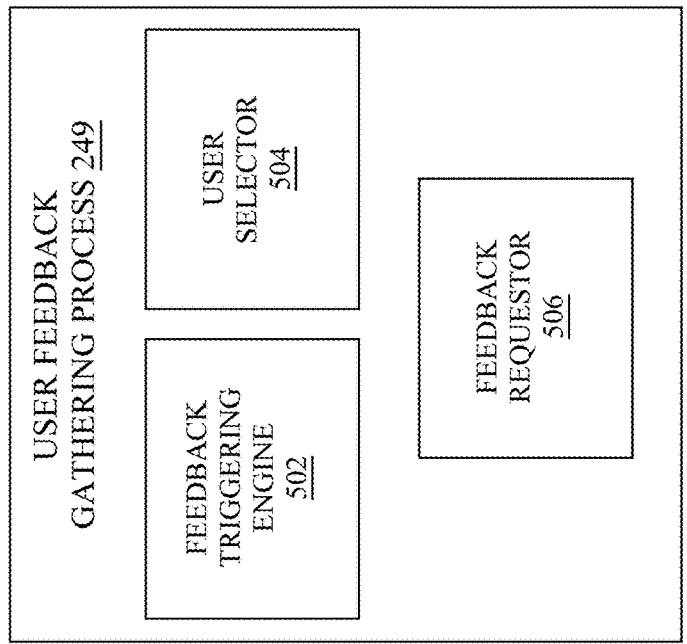
FIG. 5 illustrates an example architecture for opportunistic user feedback gathering.

Operationally, FIG. 5 illustrates an example architecture 500 opportunistic user feedback gathering, according to various embodiments. At the core of architecture 500 is user feedback gathering process 249, which may be executed by a controller for a network, a server, or another device in communication therewith. For instance, user feedback gathering process 249 may be executed by a controller for a network (e.g., SDN controller 408 in FIGS. 4A-4B), a particular networking device in the network (e.g., a router, etc.), another device or service in communication therewith, or the like. In some embodiments, user feedback gathering process 249 may be used to implement a predictive application aware routing engine, such as predictive application aware routing engine 412.

As shown, user feedback gathering process 249 may include any or all of the following components: a feedback triggering engine 502, a user selector 504, and/or a feedback requestor 506. As would be appreciated, the functionalities of these components may be combined or omitted, as desired. In addition, these components may be implemented on a singular device or in a distributed manner, in which case the combination of executing devices can be viewed as their own singular device for purposes of executing user feedback gathering process 249.

In various embodiments, feedback triggering engine 502 may be responsible for determining when feedback should be solicited regarding the user experience of a particular online application, in an opportunistic manner. To do so, feedback triggering engine 502 may interact with an or all of the following:

The online application itself or a monitoring agent associated with the application, to obtain performance metrics regarding the application and/or an QoE metrics captured by the application. Example metrics that feedback triggering engine 502 may obtain in this manner may include mean opinion score (MOS) data, user feedback, application-specific parameters (e.g., a frame rate, a concealment time, etc.), or the like. As would be appreciated, user feedback may have different formats, such as a categorical label (e.g., Excellent, Good, Average, Poor) or a scalar value (from X to Y).

Networking entities in the network, to obtain performance metrics regarding the network (and its paths) via which traffic for the application is sent. For instance, feedback triggering engine 502 may obtain an indication from a network controller as to a sudden degradation in one or more path metrics (e.g., delay, loss, jitter, throughput, etc.) along a path (e.g., via the Internet, SD-WAN, etc.). Such information may include raw telemetry data (e.g., Netflow records, probing results, etc.) or a summary derived therefrom (e.g., an SLA violation notification). Other information that feedback triggering engine 502 may also obtain in this manner may further include change of route notifications (e.g., BGP updates).

Based on the information obtained by feedback triggering engine 502, it may decide to trigger the collection of feedback by one or more users of the online application as to their experience(s) with the application. In various embodiments, feedback triggering engine 502 may do so in response to identifying a potential change in the user experience. For instance, such a potential change in the user experience may be indicated by a change in the performance metrics of the network or a particular path. In other cases, feedback triggering engine 502 may identify the potential change based on a change in the operation of the application, such as when a videoconferencing application automatically decreases the framerate mid-call.

In various embodiments, user selector 504 is responsible for selecting one or more users from which feedback is to be solicited regarding their experience with the online application. For instance, in response to a signal from feedback triggering engine 502 that a potential change has occurred in the QoE of the application, user selector 504 may identify which users are potentially affected and determine which of them should be prompted to provided feedback. Example factors that user selector 504 may use in its selection may include, but are not limited to, any or all of the following:

The location of the user and their endpoint device. For instance, user selector 504 may select a user to query for feedback based on their endpoint device being along a network path experiencing performance degradation, being in the middle of a session for which operation of the application has changed, or the like. In a further embodiment, user selector 504 may also select a user to query for feedback based on their proximity to another user whose endpoint device meets any of these criteria.

Information indicative of the mood of the user. Such information may include, for example, the cadence or frequency at which the user has been asked to provide feedback in the past, whether the user actually supplied the requested feedback, the current activities of the user (e.g., their web actions, clicks, mouse hover-over actions, etc.), an indication by the user as to their amenability to provide feedback (e.g., via an emoticon that symbolizes "do not ask me again," "ask me again later," etc.) or the like.

In addition to selecting which user(s) to query for feedback regarding their experiences with the application, user selector 504 may also control one or more parameters of the feedback request sent to those user(s), in various embodiments. One such parameter may control, for instance, which question or questions are asked of a given user as part of the feedback request. In some embodiments, user selector 504 may select a question may be based in part on the type of application experience degradation that is suspected (e.g., degraded voice quality, degraded video quality, slow response time, etc.) and/or the suspected root cause of the degradation. Further parameters of the feedback request selected by user selector 504 may also control the amount of time that a given request is presented to a user (e.g., a popup that lasts x-number of seconds), the type of feedback being requested (e.g., categorical vs. scalar), and the like.

Once user selector 504 has determined who to query for feedback and how, feedback requestor 506 may cause feedback requests to be sent to the endpoint devices operated by those one or more users, in various embodiments. According to various embodiments, feedback requests may be presented to the selected user(s) via any or all of the following mechanisms:

- Directly within the application, if so supported. To do so, feedback requestor 506 may signal to the application that feedback request(s) should be presented to the indicated user(s) and the parameters for the request(s).
- Through a mobility client installed on the endpoint(s) of the selected user(s). In general, such a mobility client may be used by an enterprise network to extend its network perimeter to remote endpoint devices. For instance, a mobility client may be responsible for establishing a virtual private network (VPN) connection, performing certain security checks, or the like, at the endpoint device. Prompting a user for application feedback via a mobility client has the advantage of the client already running with high privileges and can seek feedback for any application currently being used. Such a request may take the form, for instance, as a pop-up window or as part of an existing user interface. In addition, interfacing with a mobility client also allows user feedback gathering process 249 the potential to collect details about the endpoint device (e.g., its Wi-Fi details, VPN information, CPU utilization, etc.) and/or network details from the standpoint of the endpoint device.
- Via a browser API. Such mechanism may allow feedback requestor 506 to request user feedback regarding their application experience (e.g., through the use of a plugin installed within a web browser). For instance, ThousandEyes Endpoint represents one example browser plugin that could be extended for this purpose. In some instance, this approach also allows for the collection of data indicative of the mood of the user, such as their activities (e.g., web actions, clicks, mouse hover-overs, etc.). This information could be used with a behavioral profile for the user, to infer the mood of the user, either as an indicator of their satisfaction with the application or their amenability to being asked to provide explicit feedback regarding the application. Of course, the browser plugin could also be used to request such explicit feedback, such as via a pop-up window or the like.
- Via instrumentation of the application. As would be appreciated, online applications are increasingly leveraging monitoring solutions that rely on injecting certain code into their application for purposes of real-user monitoring (RUM), application performance monitoring, security monitoring, and the like. For instance, AppDynamics operates by injecting JavaScript code into the application (e.g., for execution by the browser itself), for purposes of monitoring the application. Such a mechanism could also be extended to prompt a user to provide application experience feedback. This approach has the advantages of being application independent and could work with any number of different applications. It also could be centrally configured and managed.

Figure 6:
FIG. 6 illustrates an example user interface to gather user feedback regarding an online application.

FIG. 6 illustrates an example user interface 600 to gather user feedback regarding an online application, according to various embodiments. As shown, user interface 600 may take the form of a popup presented to a user via a mobility client, such as Cisco AnyConnect. Here, since the mobility client is executed concurrently with any number of online applications, user interface 600 may ask the user to provide feedback regarding their experience/satisfaction with multiple applications such as Webex and Office365 (0365), shown.

Referring again to FIG. 5, feedback requestor 506 may also be responsible for receiving and/or aggregating the user feedback that results from its requests. In turn, user feedback gathering process 249 may make the feedback available to any number of data consumers. For instance, in some embodiments, user feedback gathering process 249 may provide the obtained user feedback to routing process 248 for purposes of making routing decisions for network traffic associated with the application. In a predictive routing implementation, for example, routing process 248 may use the experience feedback to predict when the network conditions are likely to result in degraded application experience and make routing decisions, accordingly (e.g., by rerouting the application traffic in advance of the predicted degradation). In further instances, user feedback gathering process 249 may make the application feedback available for review by an administrator or other interested party, such as via a SaaS application portal, a user interface, or the like. For instance, user feedback gathering process 249 may indicate the user feedback and the corresponding symptoms of the degraded experience for review (e.g., response time for the application is too high, video quality is poor, but voice quality is good, etc.).

In some embodiments, the operations of feedback triggering engine 502, user selector 504, and/or feedback requestor 506 may be controlled by rules that are either predefined or set by an administrator. Such rules may control under which conditions user feedback is to be obtained, how it is to be obtained, and the like.

By way of example of the operation of user feedback gathering process 249, assume that the SharePoint application is being used by a user to edit an online document without any significant issues. At some point, the user is sharing the same document with four other participants who start to edit it, simultaneously. Based on the information available to it, feedback triggering engine 502 may be aware of the details of the additional users (location, other details) and suspect that the application QoE might be degraded. In turn, user selector 504 may opt to request feedback from the users in the least intrusive manner possible. For instance, SharePoint app could display a thumb up/down query in its top-right corner for the next 10 seconds (and potentially fading away, slowly). Since a narrow time window was chosen, this makes it much more feasible to correlate the feedback with the exact event causing the potential QoE degradation. The user is also likely to appreciate being asked for feedback at the time in which the QoE starts to deteriorate, as it shows the system was intelligent enough to ask and confirm that the application experience was actually degraded.

By way of another example, assume that WebEx is being used to host a video conference between two users located across the Europe, the Middle East, and Africa (EMEA) region. Everything is working as expected until a new user joins the conference from the U.S.A. and starts to share their screen. This could be due, for instance, to the new user having to use WebEx resources in the EMEA region. In turn, the WebEx application codec may respond by decreasing video/screen sharing resolution, but exhibit a high concealment time. Based on this, user feedback gathering process 249 may elect to ask the user for feedback, such as by asking the new user to rate their experience as good or back (e.g., "thumbs up" or "thumbs down") via an option that appears on a voice icon for 10 seconds. Optionally, type of requested feedback could also depend on the probable root cause for the suspected QoE degradation. For example, feedback triggering engine 502 may have received a notification of degraded QoE (e.g., poor voice), or a path metric degradation (e.g., detection of a sudden packet loss above 40% for three minutes), in which case user feedback gathering process 249 may narrowly ask the user "What is your user experience?" and "Are you experiencing poor voice quality?" The quality of the questions/feedback request (e.g., the symptom) may help to enhance their overall perception of the application, especially if it is indicated that the application is not to blame for the degradation. For example, if the feedback request asks "are you experiencing poor voice quality (probably due to a service provider issue)," the user may be more tolerant of the poor QoE. Note also that the use of rules also allows for the reduction of the required user feedback (e.g., if the QoE is good, there is no need to request user feedback), except in cases where pure exploration is desired.

Figure 7:
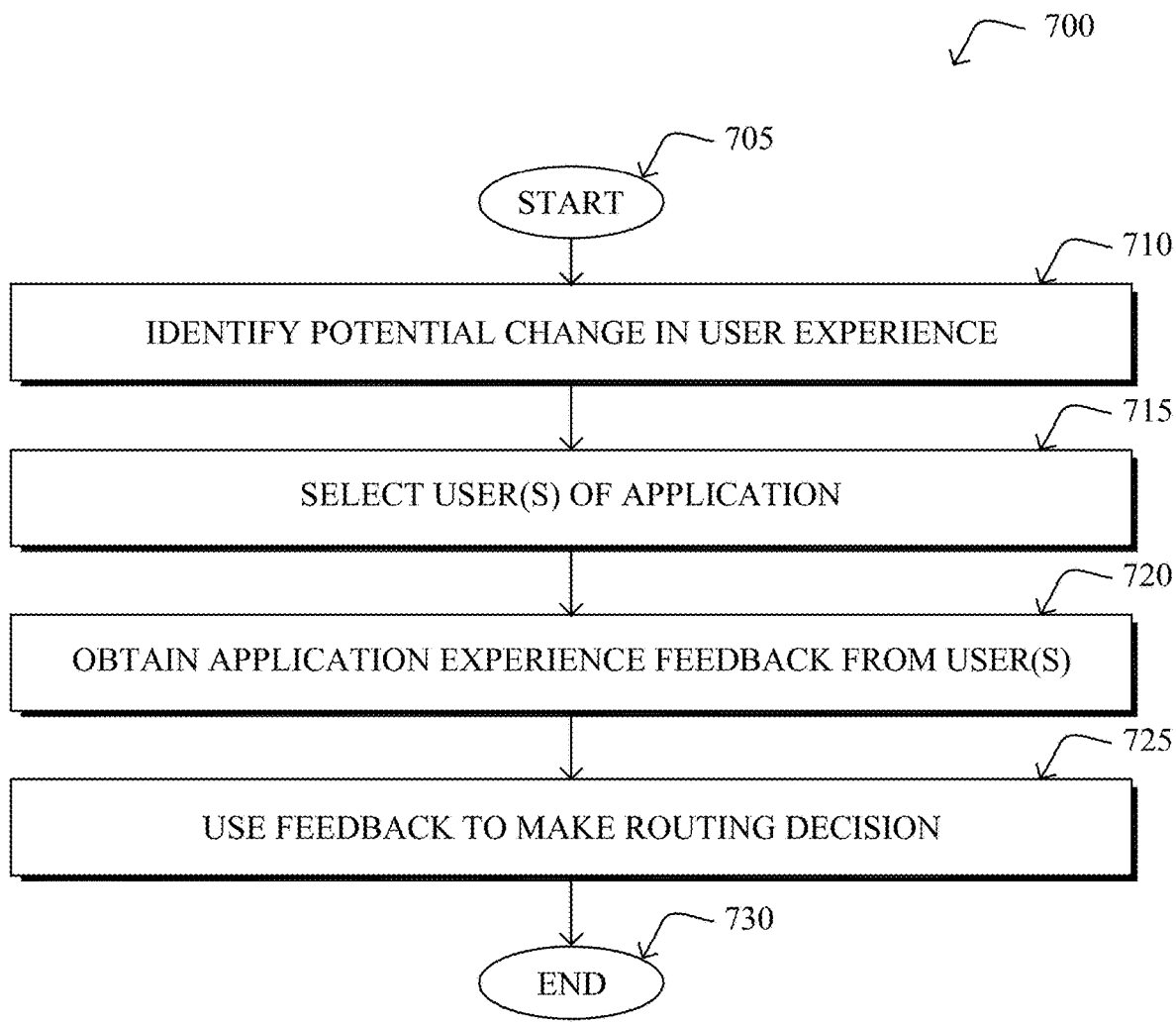
FIG. 7 illustrates an example simplified procedure for opportunistic user feedback gathering for application-aware routing.

FIG. 7 illustrates an example simplified procedure 700 (e.g., a method) for application-specific high frequency passive probing, in accordance with one or more embodiments described herein. For example, a non-generic, specifically configured device (e.g., device 200), such as a networking device (e.g., a router, etc.), a server, a network controller, or other device in communication therewith, may perform procedure 700 by executing stored instructions (e.g., user feedback gathering process 249). The procedure 700 may start at step 705, and continues to step 710, where, as described in greater detail above, the device may identify a potential change in user experience of an online application. In some embodiments, the device may do so by identifying a change in performance of a path in the network via which the traffic of the online application is conveyed (e.g., a change in its packet loss, jitter, latency, throughput, etc.). In other embodiments, the device may do so by receiving an indication that a video resolution of the online application has decreased or a concealment time of the online application has increased.

At step 715, as detailed above, the device may select, based on the potential change in user experience, a set of one or more users of the online application. In some embodiments, the device also selects the set of one or more users of the online application based in part on their location. In further embodiments, the device selects the set of one or more users of the online application based in part on their prior responses to requests for feedback regarding their experience with the online application. In some embodiments, the device may also select a parameter of a feedback request sent to one or more user interfaces associated with the set of one or more users of the online application. In some embodiments, the parameter controls which question is asked by the feedback request. In further embodiments, the parameter controls a duration of time during which the feedback request is presented by the one or more user interfaces.

At step 720, the device may obtain, from the set of one or more users of the online application, feedback regarding their experience with the online application, as described in greater detail above. In various embodiments, the feedback is obtained via one of: a JavaScript-injected popup, a browser application programming interface (API), or a mobility client.

At step 725, as detailed above, the device may use the feedback obtained from the set of one or more users of the online application to make a routing decision in a network regarding traffic of the online application. In some embodiments, the device may do so by using the feedback to predict a decrease in the user experience of the online application based on one or more performance metrics from the network. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for opportunistic user feedback gathering for application-aware routing, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   identifying, by a device, a potential change in user experience of an online application;
   selecting, by the device and based on the potential change in user experience, a set of one or more users of the online application;
   obtaining, by the device and from the set of one or more users of the online application, feedback regarding their experience with the online application; and using, by the device, the feedback obtained from the set of one or more users of the online application to make a routing decision in a network regarding traffic of the online application;

wherein using the feedback to make the routing decision comprises using the feedback to predict a decrease in the user experience of the online application based on one or more performance metrics from the network.

2. The method as in claim 1, wherein identifying the potential change in user experience of the online application comprises: identifying, by the device, a change in performance of a path in the network via which the traffic of the online application is conveyed.

3. The method as in claim 1, wherein identifying the potential change in user experience of the online application comprises: receiving, at the device, an indication that a video resolution of the online application has decreased or a concealment time of the online application has increased.

4. The method as in claim 1, further comprising: selecting, by the device, a parameter of a feedback request sent to one or more user interfaces associated with the set of one or more users of the online application.

5. The method as in claim 4, wherein the parameter controls which question is asked by the feedback request.

6. The method as in claim 4, wherein the parameter controls a duration of time during which the feedback request is presented by the one or more user interfaces.

7. The method as in claim 1, wherein the device selects the set of one or more users of the online application based in part on their location.

8. The method as in claim 1, wherein the device selects the set of one or more users of the online application based in part on their prior responses to requests for feedback regarding their experience with the online application.

9. The method as in claim 1, wherein the feedback is obtained via one of: a JavaScript-injected popup, a browser application programming interface (API), or a mobility client.

10. An apparatus, comprising:
   one or more network interfaces to communicate with a network;
   a processor coupled to the one or more network interfaces and configured to execute one or more processes; and
   a memory configured to store a process that is executable by the processor, the process when executed configured to:
   identify a potential change in user experience of an online application;
   select, based on the potential change in user experience, a set of one or more users of the online application;
   obtain, from the set of one or more users of the online application, feedback regarding their experience with the online application; and
   use the feedback obtained from the set of one or more users of the online application to make a routing decision in a network regarding traffic of the online application;
   wherein the apparatus uses the feedback to make the routing decision by: using the feedback to predict a decrease in the user experience of the online application based on one or more performance metrics from the network.

11. The apparatus as in claim 10, wherein the apparatus identifies the potential change in user experience of the online application by: identifying a change in performance of a path in the network via which the traffic of the online application is conveyed.

12. The apparatus as in claim 10, wherein the apparatus identifies the potential change in user experience of the online application by: receiving an indication that a video resolution of the online application has decreased or a concealment time of the online application has increased.

13. The apparatus as in claim 10, wherein the process when executes is further configured to: select a parameter of a feedback request sent to one or more user interfaces associated with the set of one or more users of the online application.

14. The apparatus as in claim 13, wherein the parameter controls which question is asked by the feedback request.

15. The apparatus as in claim 13, wherein the parameter controls a duration of time during which the feedback request is presented by the one or more user interfaces.

16. The apparatus as in claim 10, wherein the apparatus selects the set of one or more users of the online application based in part on their location.

17. The apparatus as in claim 10, wherein the apparatus selects the set of one or more users of the online application based in part on their prior responses to requests for feedback regarding their experience with the online application.

18. A tangible, non-transitory, computer-readable medium storing program instructions that cause a device to execute a process comprising:
   identifying, by the device, a potential change in user experience of an online application;
   selecting, by the device and based on the potential change in user experience, a set of one or more users of the online application;
   obtaining, by the device and from the set of one or more users of the online application, feedback regarding their experience with the online application; and
   using, by the device, the feedback obtained from the set of one or more users of the online application to make a routing decision in a network regarding traffic of the online application;
   wherein using the feedback to make the routing decision comprises: using the feedback to predict a decrease in the user experience of the online application based on one or more performance metrics from the network.

* * * * *